April 8, 1930. C. S. BRAGG ET AL 1,753,283
POWER ACTUATOR FOR BRAKE MECHANISM OF AUTOMOTIVE VEHICLES
Original Filed March 5, 1925
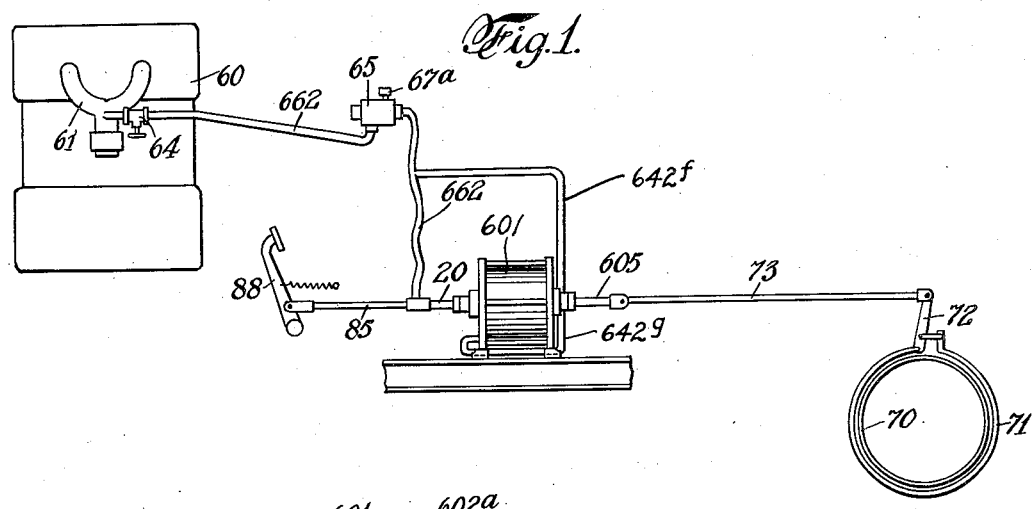
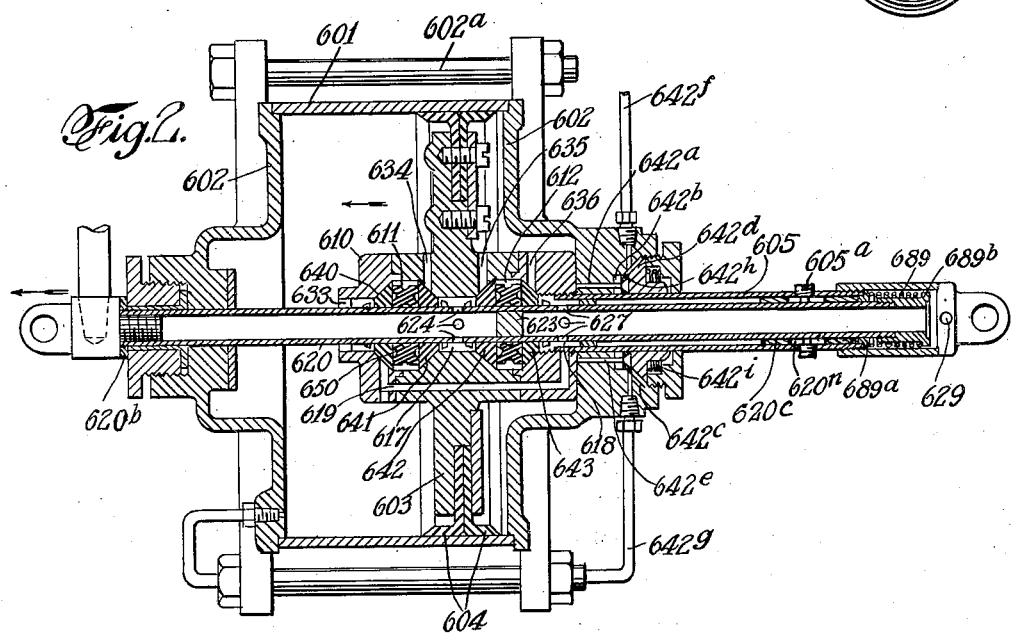
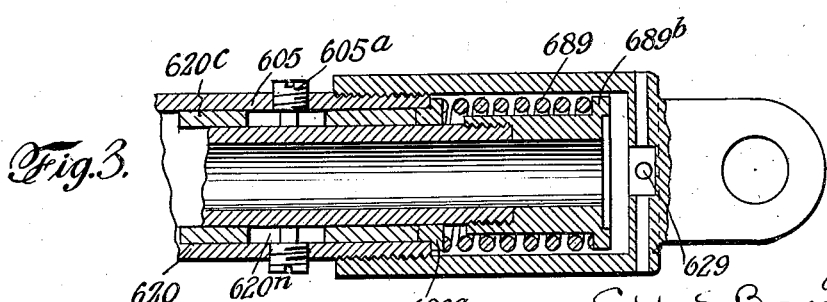

Patented Apr. 8, 1930

1,753,283

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR FOR BRAKE MECHANISM OF AUTOMOTIVE VEHICLES

Original application filed March 5, 1925, Serial No. 13,183. Divided and this application filed August 30, 1926. Serial No. 132,368. Renewed June 22, 1928.

Our invention consists in the novel features hereinafter described, reference being had to the accompanying drawing which shows one embodiment of the invention selected by us for purposes of illustration, and the said invention is fully disclosed in the following description and claims.

This application is a division of our former application for Letters Patent of the United States filed March 5, 1925, and given Serial No. 13,183.

Our invention relates to power actuators for the brake mechanism of automotive vehicles, and comprises an actuator cylinder closed at both ends, a piston located therein and connected with the brake mechanism to be operated, reversing valve mechanism operatively connected with sources of higher and lower pressures, as a source of suction and the atmosphere respectively, an operator operated part, connected with the valve mechanism, and connected with the piston by means permitting lost motion sufficient to effect the operation of the valve mechanism and means controlled by an auxiliary valve which is held in open position by the piston when in its retracted or off position, for connecting the cylinder on both sides of the piston with the source of lower pressure or suction, and a spring interposed between a part connected with the operator operated part and the piston of the actuator, normally tending to retract the operator operated part to its normal or off position, the parts being so constructed and arranged that when the operator actuates the operator operated part in a direction to effect a power stroke of the piston, the pressure will be applied first to the said spring in a direction to compress it, and said pressure will be transferred from the spring to the piston and effect a movement of the piston in a direction to apply the brakes operatively connected therewith, the first movement of the piston releasing the auxiliary valve and permitting it to seat before the reversing valve mechanism is actuated to produce the effective working stroke of the piston in a direction to apply the brakes, by admitting higher pressure fluid in rear of the piston. By this means the force applied by the operator operated part to overcome the resistance of the retracting spring and operate the valve mechanism, is made effective to produce a movement of the piston in a direction to apply the brakes, and also to place the actuator in condition to operate effectively by permitting the auxiliary valve to close.

In order that our present invention may be clearly understood, we have shown in the accompanying drawing an embodiment thereof selected by us for purposes of illustration, in which drawing, Fig. 1 is a diagrammatic view representing an installation of our improved power actuator in connection with an internal combustion engine of an automotive vehicle, for the operation of the brake mechanism thereof.

Fig. 2 is an enlarged sectional view illustrating our improved actuator, and showing our present invention embodied therein.

Fig. 3 is an enlarged detail sectional view of a portion of the construction illustrated in Fig. 2.

In Fig. 1 of the accompanying drawing we have shown diagrammatically an installation suitable for use in an automotive vehicle, in which our improved actuator is shown as interposed in the connection between a foot lever, 88, and brake mechanism for the vehicle diagrammatically represented at 70, 71 and 72, indicating a brake drum, brake band, and brake lever, but it is to be understood that our invention is applicable to any form of brake mechanism. 60 represents an internal combustion engine for propelling the vehicle, and provided with an intake manifold indicated at 61, to which is connected a suction pipe, 662, provided in this instance with a check valve, 65, and a vent valve, 67$^a$, normally closed, and opening outwardly. In some instances we may employ an adjustable restricting valve or regulating valve indicated at 64, but these valves form no part of our present invention. The suction pipe 662 communicates with our improved power actuator, the cylinder of which is indicated at 601 in Fig. 1, the said pipe having a flexible portion connected to a hollow valve actuating sleeve, 20, and communicating with the reversing valve mechanism. The sleeve, 20, is connected by link, 85, with the foot lever, 88, and the piston rod of the actuator indicated at 605, is connected by link, 73, with the brake lever, 72.

In Fig. 2, we have shown one form of our improved actuator embodying our present invention. The cylinder, 601, is closed at both ends by heads, 602, connected by bolts, 602$^a$, and nuts. 603 represents a double acting piston provided with oppositely disposed gaskets, 604, and a hollow piston rod, 605, extending through a stuffing box in one end of the cylinder. The hub, 610, of the piston is provided with valve chambers, 611, 612, each of which is provided with two valve seats oppositely disposed to each other. The piston hub is also provided with an outlet or suction chamber, 617, between the valve chambers, and communicating therewith, and the piston hub is also provided with a higher pressure chamber, 618, in this instance communicating with the atmosphere through an aperture, 629, in the hollow piston rod, 605, which may communicate with any other source of higher pressure. The chamber, 618, communicates directly with the valve seat in chamber, 612, and by a lateral passage, 619, with the valve seat at the opposite end of the piston hub. 620 represents the valve actuating part consisting in this instance of a valve actuating sleeve passing through a stuffing box in the cylinder head, and extending longitudinally through the piston hub, and chambers thereof, and a hollow piston rod, 605, and being movable longitudinally to effect the operation of the reversing valves through which it extends co-axially. The valve sleeve is divided into two parts by a plug, 623, and is provided on one side of said plug with suction apertures, 624, communicating with the suction chamber, 617, and on the other side of said plug with aperture, 627, communicating with the chamber, 618, and with the atmosphere. The suction chamber is adapted to be connected with the cylinder on opposite sides of the piston by ports, 634, 635, and the chamber, 618, is adapted to be connected with the cylinder on opposite sides of the piston by means of ports, 636, and 633. Each of the valve chambers, 611, and 612, is provided with a pair of oppositely disposed poppet valves engaging the valve seats thereof, said valves being preferably of molded rubber, and having central apertures fitting around the sleeve, 620, but permitting the movement of the sleeve therethrough. The valves are indicated at 640, 641, 642, and 643, and are normally seated by welding means, rubber cushioning devices, 650, interposed between the pair of valves in each valve chamber, being shown for this purpose. The sleeve, 620, is provided with means for opening one valve of each pair when the sleeve is moved in either direction, this function being performed in this instance by collars secured to the sleeve. The specific details of the valve mechanism form no part of our present invention.

The actuator is provided with means for maintaining a partial vacuum within the cylinder on both sides of the piston when the piston is in retracted or off position, in accordance with our former application Serial No. 506, filed January 25, 1925, the specific details of which are not herein claimed, except in combination with the retracting spring hereinafter described. As shown in the drawing, the head of the cylinder adjacent to which the piston comes to rest in off position is provided with a passage or passages, 642$^a$, communicating with a recess, 642$^b$, in which is located a valve seat, 642$^c$, engaged by a movable valve, 642$^d$. The valve seat, 642$^c$, is connected by a pipe, 642$^f$, with the source of suction, as the suction pipe, 662, independently of the reversing valve mechanism, the valve seat, 642$^c$, is also connected by a pipe, 642$^g$, with the actuator cylinder on the forward side of the piston. The valve, 642$^d$, is shown provided with a light spring, 642$^i$, which assists in seating it when the piston is moved away from the adjacent end of the cylinder. The valve is moved in the opposite direction by a ring, 642$^h$, provided with one or more projections, 642$^e$, extending into the cylinder far enough to be struck by the piston hub when the piston returns to its normal position, so as to insure the opening of the valve, 642$^d$.

As shown in Figs. 2 and 3, the retracting spring for the pedal lever and valve actuating sleeve is directly applied to the actuating sleeve itself, for the purpose of accomplishing certain advantageous results hereinafter described. A certain amount of force must be exerted by the operator in overcoming the pressure of the retracting spring whenever the valve actuating mechanism is operated in a direction to apply the brake, and this pressure, which may be roughly estimated at about forty pounds pressure required to compress the spring, and which, with the customary reduction of from three to one to four to one, represents ten to fifteen pounds pressure of the operator's foot, is entirely lost where the retracting spring is interposed between the pedal lever and a part of the chassis. It also requires some additional pressure to operate the valves against their cushioning devices, which may be roughly estimated at fifteen pounds. We, therefore, interpose the retracting spring between the valve actuating part and the piston, so that the pressure or force exerted by the operator in compressing the spring, will be transferred from the spring to the piston, and will tend to move it in a direction to apply the brakes, thus causing any physical power exerted by the operator to assist the action of the pressure fluid in the application of the brakes.

We prefer to calibrate this spring, with special reference to the resistance of the brake mechanism, so that the power required to compress the spring, plus that required to overcome the resistance of the cushioning and seating devices of the valve mechanism, shall be slightly greater than the resistance of the brake mechanism. We also obtain a further result, to wit, that when the operator applies pressure to the foot pedal, the first effect will be to move the piston slightly in a forward direction, sufficiently to release the auxiliary valve, 642$^d$, before the reversing valve mechanism is actuated, thus preventing any possibility of withdrawing any of the pressure fluid admitted for the application of the brake mechanism, before the piston has moved sufficiently to seat said valve, to the intake manifold. As shown in Figs. 2 and 3, for example, we provide the valve actuating sleeve with a spring, 689, interposed between a collar, 689$^a$, secured to the hollow piston rod, 605, and a collar, 689$^b$, secured to the valve actuating sleeve, 620, the said spring being calibrated, preferably to resist a longitudinal compressive force of approximately 40 pounds. It will be understood that the piston itself, when in normal position, sustains the draft of the brake mechanism, which exerts a pull on the piston in a direction to restore it to or toward its normal position, of slightly more than forty pounds, or in other words, a little more than the pressure required to compress the retracting spring, 689. In the event that the load of the brakes and their retracting springs is not in excess of the force required to compress the retracting spring, 689, of the actuator, they must be strengthened to exceed it, as otherwise the force of the retracting spring 689, might tend to keep the piston from coming to rest in the off position.

When the pedal is depressed and the valve actuating sleeve is moved forward, the physical power of the operator is directly applied to the retracting spring, 689, in a direction toward the piston, and is therefore transmitted to the piston itself. This pressure applied to said spring must be sufficient to overcome the resistance of the retracting spring, and also the cushioning and sealing device of the valves, or approximately 55 pounds, for example, and therefore exceed the resistance of the brake mechanism and its retracting springs. It, therefore, follows that when the operator depresses the pedal, the first effect is a slight movement of the piston by the physical force of the operator, sufficient to permit the auxiliary valve, 642$^d$, to close before the valve mechanism of the actuator is operated. This movement of the piston will start the application of the brakes, which will cause a gradually increasing resistance on the part of the brake mechanism to this movement, and as soon as this resistance of the brake mechanism exceeds the pressure required to compress the retracting spring, 689, the valve mechanism will be actuated to effect the operation of the piston and brake mechanism, the piston then moving forward under the combined action of the higher pressure fluid and the physical force of the operator.

In the form of actuator herein shown and described, and assuming that the engine is running and that a condition of rarification exists in the cylinder on both sides of the piston previous to the depression of the foot lever, owing to the suction pipes, 642$^f$ 642$^g$, as soon as the spring, 689, begins to compress the valve sleeve, 620, will begin to move longitudinally in the direction of the arrow in Fig. 2, with respect to the piston with the result that the valves, 641 and 643, will be opened, placing the portion of the cylinder forward of the piston in communication with the suction chamber, 617, and the portion of the cylinder in rear of the piston in communication with the higher pressure chamber, 618. The piston will move forward as before stated under the combined action of the higher pressure fluid in rear of the piston, and the physical force of the operator applied through the spring, 689. As the condition of rarification exists in the cylinder forward of the piston, no appreciable quantity of air will be withdrawn from the cylinder into the manifold of the engine during the application of the brakes, and as long as the sleeve, 620, moves forward with the piston under the presser of the operator's foot, the piston will continue to move in the same direction until the brakes are applied to the extent desired. As soon as the operator ceases to move the pedal, the continued movement of the piston under the action of the higher pressure fluid and the compressed spring, 689, will cause it to move with respect to the sleeve, 620, far enough to permit the valves, 641 and 643, to seat under the action of their cushioning devices, 650, thus bringing the parts of the reversing valve mechanism into their original positions illustrated in Fig. 2. If it becomes necessary to continually release and reapply the brakes as in descending a long grade or in congested traffic, a slight release of the pedal, 88, will effect a reverse movement of the sleeve, 620, sufficient to open the valve, 642, without opening the valve, 640, their respective operating collars being so located on the sleeve as to effect this result. A small amount of the air or other higher pressure fluid admitted in rear of the piston will be exhausted, and the retracting force of the brakes will draw the piston rearwardly and with respect to the valve seat, 620, until the valve, 642, is again seated, thus enabling the brake mechanism to release itself to the extent desired, while leaving the cylinder forward of the piston still in a state of rarification, which may even be increased above that existing in the manifold by the force of the brake mechanism acting to pull the piston rearwardly. If the operator now again depresses the pedal, 88, the valve sleeve, 620, will again be shifted forwardly with respect to the piston, admitting air or higher pressure fluid in rear of the piston and again applying the brakes, and these operations may be repeated as often as desired. When it is desired to fully release the brakes and return the piston to its normal position, the operator will remove his foot from the pedal, and the retracting spring, 689, will shift the valve sleeve, 620 rearwardly to its full extent, thereby opening the valve, 642, more widely than before to connect the cylinder in rear of the piston with the suction chamber, and opening the valve, 640, sufficiently to connect the cylinder forward of the piston with the higher pressure chamber, 618, through the annular passage, 633, and the by-pass, 619, in the piston hub. The piston will then return to its normal position, and when the hub of the piston strikes the pins or projections, 642$^e$, the auxiliary valve, 642$^d$, will be opened, establishing communication between the cylinder on both sides of the piston, and the suction pipe, and exhausting the higher pressure fluid admitted during the return movement of the piston.

As will be seen, there is a certain amount of lost motion between the valve actuating sleeve, 620, and the piston and piston rod, and we provide means for limiting it, so that after it is taken up the physical power of the operator may be directly applied to the piston and parts connected therewith, in the manner set forth in our former application, Serial No. 506. In the present instance, the sleeve, 620, is provided with recesses, 620$^n$, which may be formed for example in a collar, 620$^c$, and a piston rod is provided with oppositely disposed set screws, 605$^a$, extending into the recesses, 620$^n$, so that when the brakes are applied by the actuator, the operator may by further pushing on the foot lever add his physical force to that of the actuator, and so that, should the power of the actuator fail for any reason, the operator may move the piston by his physical force to apply the brake mechanism, the movement of the valve sleeve placing the valves into position to vent the cylinder. The vent valve, 67$^a$, will permit this action to take place even if the engine is not running, and the throttle and inlet valves of the motor are closed, and will prevent the compression of air which would have to be expelled from the cylinder under such circumstances.

It will be seen that according to our present invention, the actuation of the brake pedal by the operator first moves the piston forward, and permits the auxiliary valve to seat before the controlling valve mechanism of the actuator is operated, to permit higher pressure fluid in rear of the piston, and hence none of such higher pressure fluid will pass out to the manifold through the suction pipe, 642$^f$, controlled by said auxiliary valve, and the application of the brakes will take place under the full power of the piston, to which is added the amount of the physical power of the operator required to compress the spring, 689. In other words, the physical force exerted by the operator to compress the spring, 689, and actuate the controlling valve mechanism of the actuator is not lost, but is first applied to the piston to move it slightly in a direction to assist in applying the brakes and permitting the auxiliary valve to close, and as soon as the resistance of the brake mechanism exceeds the pressure for which the spring, 689, is calibrated, and that required to open the valves, the spring will yield permitting the actuation of the valves to admit higher pressure in rear of the piston, and actuate the piston by power, while the pressure of the operator's foot continues to assist in the forward movement of the piston in a direction to apply the brakes, and when the brakes are fully applied, the operator may add still further physical power by reason of the devices limiting the lost motion between the valve actuating sleeve and piston.

It will be obvious that as soon as the lost motion between the valve actuating sleeve and the piston is limited in the manner described, the spring, 689, will be relieved of any further tension from the connections between the operator operated part and the piston and brake mechanism connected therewith, and this action will occur when the power supplying passages for admitting air or other higher fluid pressure to the cylinder in rear of the piston are in communication.

As shown in the drawings, the valve actuating sleeve is provided with means for arresting it in such a position as to hold the valve mechanism in neutral position when the piston is retracted and comes to rest, with its hub in engagement with one of the cylinder heads, 602. In this instance, we have shown the valve actuating sleeve, 620 provided with an adjustable stop nut, 620$^b$, having a threaded engagement with the sleeve, and adapted to engage the adjustable nut for the stuffing box in the adjacent head, 602, of the cylinder, when the piston is in retracted position, as shown in Fig. 2. When the piston returns to normal position as previously described, this stop collar, 620$^b$, will engage the co-acting part of the cylinder, as the nut of the stuffing box, and arrest the further return movement of the valve actuating sleeve just before the piston comes to rest against the opposite cylinder head, so that the further movement of the piston to full retracted position opens the auxiliary valve, 642ᵈ, and simultaneously returns the main valve in the piston to normal position, and effects a compression of the spring, 689. The spring, 689, therefore normally exerts its tension to hold the valve actuating sleeve in such position that the reversing valve mechanism in the piston is maintained in the neutral position, and prevents any movement of the valve sleeve with respect to the piston until the auxiliary valve, 642ᵈ, has been closed, as previously described by the movement of the valve actuating sleeve in the direction of the arrow further compressing the spring, 689, and moving the piston sufficiently to permit the valve, 642ᵈ, to close.

What we claim and desire to secure by Letters Patent is:—

1. In a power actuator, the combination with a cylinder closed at both ends, a piston in said cylinder, reversing valve mechanism, means for connecting the cylinder with a source of suction and with a source of higher pressure fluid under the control of said valve mechanism, of an auxiliary suction passage operatively connected with the cylinder on both sides of the piston, auxiliary valve mechanism controlling said suction passage, and provided with a part extending into the cylinder in position to be engaged by the piston, to open said valve and hold it in open position when the piston is in its retracted position, an operator operated part connected with the valve mechanism, means for connecting said operator operated part with the piston including a retracting spring interposed between a part connected with the operator operated part and the piston, and so calibrated that when the operator operated part is moved in a direction to operate the valves to effect a working stroke of the piston, the piston will be moved by said operator operated part to release the auxiliary valve and permit it to close, before the reversing valve mechanism is actuated.

2. In a power actuator, the combination with a cylinder closed at both ends, a piston in said cylinder, controlling valve mechanism for the actuator located in said piston, and means for connecting the cylinder with a source of suction and with a source of higher pressure fluid under the control of said valve mechanism, of an auxiliary suction passage connected with the cylinder on both sides of the piston, an auxiliary valve controlling said auxiliary suction passage, and provided with a part extending into the cylinder in position to be engaged by the piston when in retracted position, to open and hold said auxiliary valve in open position, a valve actuating part extending through the piston, an operator operated device connected therewith, and a retracting spring interposed between the valve actuating part and the piston, and so calibrated that when the operator operated part is moved in a direction to operate the valve mechanism to effect a working stroke of the piston, the piston will be moved sufficiently to release the auxiliary valve and permit it to seat, before the valve mechanism of the actuator is actuated.

3. In a power actuator, the combination with a cylinder closed at both ends, a piston in said cylinder, controlling valve mechanism for the actuator located in said piston, and means for connecting the cylinder with a source of suction and with a source of higher pressure fluid under the control of said valve mechanism, of an auxiliary suction passage connected with the cylinder on both sides of the piston, an auxiliary valve controlling said auxiliary suction passage, and provided with a part extending into the cylinder in position to be engaged by the piston when in retracted position, to open and hold said auxiliary valve in open position, a valve actuating part extending through the piston, an operator operated device connected therewith, and a retracting spring interposed between the valve actuating part and the piston, and so calibrated that when the operator operated part is moved in a direction to operate the valve mechanism to effect a working stroke of the piston, the piston will be moved sufficiently to release the auxiliary valve and permit it to seat, before the valve mechanism of the actuator is actuated, said valve actuating part and the piston being provided with means for limiting the lost motion between them, to enable the operator to apply further physical force to the piston beyond that required to compress said spring in addition to the power of the actuator, or to operate the actuator and parts connected with the piston thereof, in case of failure of power.

4. In an automotive vehicle provided with an internal combustion engine having a suction passage for explosive charges, and brake mechanism for the vehicle, the combination with an actuator cylinder closed at both ends, a piston in said cylinder operatively connected with brake mechanism of the vehicle, controlling valve mechanism for the actuator located in said piston, and means for connecting the cylinder with said suction passage and with a source of higher pressure fluid under the control of said valve mechanism, of an auxiliary passage for connecting said suction passage with the cylinder on both sides of the piston independently of said valve mechanism, an auxiliary valve controlling said auxiliary passage, and provided with a piston engaging part extending into the cylinder, and adapted to be engaged by the piston when in retracted position to hold said valve in open position, the connections between the piston and brake mechanism being constructed to normally hold the piston in retracted position, to maintain a state of rarification in the cylinder on both sides of the piston, a valve actuating part extending through the piston, an operator operated device connected therewith, and a retracting spring interposed between the valve actuating part and the piston, and so calibrated that the movement of the operator operated part in a direction to operate said valve mechanism of the actuator to apply the brakes will move the piston in a direction to apply the brakes, sufficiently to release the auxiliary valve and permit it to seat, before the controlling valve mechanism is actuated, whereby the force exerted by the operator to compress the spring will be effective upon the piston during its power stroke, higher pressure fluid admitted in rear of the piston to effect said stroke will be prevented from escaping through said auxiliary passage.

5. In an automotive vehicle provided with an internal combustion engine having a suction passage for explosive charges, and brake mechanism for the vehicle, the combination with an actuator cylinder closed at both ends, a piston in said cylinder operatively connected with brake mechanism of the vehicle, controlling valve mechanism for the actuator located in said piston, and means for connecting the cylinder with said suction passage and with a source of higher pressure fluid under the control of said valve mechanism, of an auxiliary passage for connecting said suction passage with the cylinder on both sides of the piston independently of said valve mechanism, an auxiliary valve controlling said auxiliary passage, and provided with a piston engaging part extending into the cylinder, and adapted to be engaged by the piston when in retracted position to hold said valve in open position, the connections between the piston and brake mechanism being constructed to normally hold the piston in retracted position, to maintain a state of rarification in the cylinder on both sides of the piston, a valve actuating part extending through the piston, an operator operated device connected therewith, and a retracting spring interposed between the valve actuating part and the piston, and so calibrated that the movement of the operator operated part in a direction to operate said valve mechanism of the actuator to apply the brakes will move the piston in a direction to apply the brakes, sufficiently to release the auxiliary valve and permit it to seat, before the controlling valve mechanism is actuated, whereby the force exerted by the operator to compress the spring will be effective upon the piston during its power stroke, higher pressure fluid admitted in rear of the piston to effect said stroke will be prevented from escaping through said auxiliary passage, said operator operated part and the piston being provided with means for limiting the extent of the lost motion between them to enable the operator to apply his physical force in excess of that required to compress said spring to the piston when desired.

6. In a power actuator, the combination with a cylinder closed at both ends, a piston in said cylinder, controlling valve mechanism for the actuator located in said piston, and means for connecting the cylinder with a source of suction and with a source of higher pressure fluid under the control of said controlling valve mechanism, of an auxiliary suction passage connected with the cylinder on both sides of the piston, an auxiliary valve controlling said auxiliary suction passage, yielding means for closing said auxiliary valve, said auxiliary valve being provided with a part adapted to be engaged by the piston when in retracted position, to open said auxiliary valve and hold it open, a valve actuating part extending through the piston and operatively connected with said controlling valve mechanism, means for arresting the piston in retracted position, means for arresting said valve actuating part in position to maintain the valve mechanism in neutral position when the piston is arrested, an operator operated part connected with the valve actuating part, and a retracting spring interposed between the valve actuating part and the piston, and so calibrated that when the operator operated part is moved in a direction to effect a working stroke of the piston, the piston will be moved to release the auxiliary valve and permit it to seat, whereby said spring acts to maintain the controlling valve mechanism in neutral position until the auxiliary valve is seated.

7. In a power actuator, the combination with a cylinder closed at both ends, a piston in said cylinder, reversing valve mechanism located in the piston, means for connecting the cylinder with a source of suction and with a source of higher pressure fluid under the control of said valve mechanism, of an auxiliary suction passage connected with the cylinder on both sides of the piston, an auxiliary valve controlling the auxiliary suction passage and provided with a part extending into the cylinder in position to be engaged by the piston when in retracted position, to open and hold said auxiliary valve in open position, a valve actuating part extending through the piston, operator operated means connected therewith, a retracting spring interposed between the valve actuating part and the piston, and so calibrated that when the valve actuating part is moved in a direction to operate the controlling valve mechanism to effect a working stroke of the piston, the piston will be moved to release the auxiliary valve and permit it to seat before the said controlling valve mechanism is actuated, and means for arresting the valve actuating part in position to hold the controlling valve mechanism in neutral position when the piston is retracted and the auxiliary valve opened, whereby said spring acts to prevent the movement of the controlling valve mechanism from neutral position until the said auxiliary valve is closed.

8. In a power actuator, the combination with a cylinder closed at both ends, a piston in said cylinder, controlling valve mechanism for the actuator located in said piston, a valve actuating sleeve extending through the piston and operatively connected with said valve mechanism, and means for connecting the cylinder with a source of suction and with a source of higher pressure fluid under the control of said controlling valve mechanism, an operator operated part connected with said valve actuating sleeve, said piston being adapted to be arrested in retracted position by engagement with a part of the cylinder, and said sleeve being provided with a stop for engaging a part connected with the cylinder before the piston comes to rest in retracted position, of an auxiliary suction passage connected with the cylinder on both sides of the piston, an auxiliary valve controlling said suction passage provided with a part extending into the cylinder in position to be operated by the piston when in retracted position, to open said auxiliary valve and hold it open, and a retracting spring interposed between the valve actuating sleeve and the piston, and so calibrated that when the operator operated part is moved in a direction to operate the controlling valve mechanism to effect a working stroke of the piston, the piston will be moved sufficiently to permit the seating of the auxiliary valve before the valve mechanism of the actuator is actuated, whereby said spring will be held under tension when the piston is in retracted position, and will act to maintain the controlling valve mechanism in neutral position until the auxiliary valve is permitted to close by the forward movement of the piston.

9. In a power actuator operating on differentials of fluid pressure, the combination with a cylinder, a piston movable therein, passages for conveying high and low fluid pressure to and from each side of the piston, valves for controlling said passages, an operator operated part for operating said valves, means interposed between the operator operated part and the piston and normally acting to cause the closure of said passages by the valves, and means for connecting the cylinder on both sides of the piston with a source of low pressure when the piston is in retracted position.

10. In combination, an automotive vehicle and brakes therefor, of a power actuator operating on differentials of fluid pressure and comprising a cylinder and a piston movable therein, connections from the piston to the brakes, passages for conveying high and low fluid pressure to and from each side of said piston, valves for controlling said passages, an operator operated part connected to control said valves, means interposed between the operator operated part and the brakes normally acting to cause the closure of said passages by the valves, and means for connecting the cylinder on both sides of the piston with the source of low pressure when the piston is in retracted position.

11. In a power actuator operating on differentials of fluid pressure, the combination with a cylinder, a piston movable therein, passages for conveying high and low fluid pressure to and from each side of the piston, valves for controlling said passages, an operator operated part for operating said valves, a spring interposed between the operator operated part and the piston and normally acting to cause the closure of said passages by the valves, and means for connecting the cylinder on both sides of the piston with a source of low pressure when the piston is in retracted position.

12. In a power actuator operating on differentials of fluid pressure, the combination with a cylinder, a piston movable therein, passages for conveying high and low fluid pressure to and from each side of the piston, valves for controlling said passages, an operator operated part for operating said valves, a spring interposed between the operator operated part and the piston and normally acting to cause the closure of said passages by the valves, means for connecting the cylinder on both sides of the piston with a source of low pressure when the piston is in retracted position, together with means for limiting the compression of the spring, whereby the operator can add his physical force to the movement of the piston or move the piston by physical force alone in case of failure of power.

13. In combination, an automotive vehicle and brakes therefor, of a power actuator operating on differentials of fluid pressure and comprising a cylinder and a piston movable therein, connections from the piston to the brakes, passages for conveying high and low fluid pressure to and from each side of said piston, valves for controlling said passages, an operator operated part connected to control said valves, a spring interposed between the operator operated part and the brakes normally acting to cause the closure of said passages by the valves, and means for connecting the cylinder on both sides of the piston with the source of low pressure when the piston is in retracted position.

14. In combination, an automotive vehicle and brakes therefor, of a power actuator operating on differentials of fluid pressure and comprising a cylinder and a piston movable therein, connections from the piston to the brakes, passages for conveying high and low fluid pressure to and from each side of said piston, valves for controlling said passages, an operator operated part connected to control said valves, a spring interposed between the operator operated part and the brakes normally acting to cause the closure of said passages by the valves, means for connecting the cylinder on both sides of the piston with the source of low pressure when the piston is in retracted position, and stops for limiting the compression of the spring whereby the operator can add his physical force to the movement of the piston or move the piston by physical force alone in case of failure of power to actuate the brakes.

15. In a power actuator operating on differentials of fluid pressure, the combination with a cylinder, a piston movable therein, passages for conveying high and low fluid pressure to and from each side of the piston, valves for controlling said passages, an operator operated part connected to the valves for actuating the same, a spring interposed between the operator operated part and the piston normally acting to cause the closure of said passages by the valves, and means for connecting the cylinder on both sides of the piston with a source of low pressure when the piston is in retracted position, said spring being so calibrated that when the operator operated part is actuated to move the valves for a power stroke of the piston said means will be automatically disconnected.

In testimony whereof we affix our signatures.

CALEB S. BRAGG.
VICTOR W. KLIESRATH.